United States Patent [19]

Yano et al.

[11] Patent Number: 4,881,612
[45] Date of Patent: Nov. 21, 1989

[54] STEERING APPARATUS FOR A VEHICLE

[75] Inventors: Kazuhiko Yano, Toyonaka; Shigenori Sakikawa, Itami; Toshiaki Okanishi, Kobe, all of Japan

[73] Assignee: Kanzaki Kokyukoki Mfg. Co. Ltd., Japan

[21] Appl. No.: 144,974

[22] Filed: Jan. 19, 1988

[30] Foreign Application Priority Data

Jan. 22, 1987 [JP] Japan .................. 62-7865[U]
Feb. 6, 1987 [JP] Japan .................. 62-16820[U]

[51] Int. Cl.⁴ .................. B62D 5/06; B62D 5/07; B62D 5/087
[52] U.S. Cl. .................. 180/132; 180/163
[58] Field of Search .................. 180/79.3, 132, 146, 180/149, 151, 79.1; 74/388 PS, 25, 413, 421 R

[56] References Cited

U.S. PATENT DOCUMENTS

| | | | |
|---|---|---|---|
| 2,508,057 | 5/1950 | Bishop | 180/149 |
| 2,931,239 | 4/1960 | Dietrich | 180/132 |
| 4,003,446 | 1/1977 | Fleury | 180/132 |
| 4,667,759 | 5/1987 | Hashimoto | 180/79.1 |

FOREIGN PATENT DOCUMENTS

| | | | |
|---|---|---|---|
| 147290 | 7/1985 | European Pat. Off. | 180/132 |
| 2531081 | 1/1976 | Fed. Rep. of Germany | 180/146 |
| 2416150 | 10/1979 | France | 180/132 |
| 49-82031 | 8/1974 | Japan | . |
| 49-85728 | 8/1974 | Japan | . |
| 122258 | 7/1983 | Japan | 180/79.3 |
| 59-572 | 4/1984 | Japan | 180/132 |
| 2266363 | 11/1985 | Japan | 180/132 |

Primary Examiner—Charles A. Marmor
Assistant Examiner—Wook Yoon
Attorney, Agent, or Firm—Saidman, Sterne, Kessler & Goldstein

[57] ABSTRACT

A steering apparatus for a vehicle which is provided at part of a handle shaft of a handle with a steering mechanism so that a steering cylinder expands and contracts to perform hydraulic steering and, even when a hydraulic system is in trouble, the steering mechanism serves as a speed reduction mechanism, thereby enabling mechanical steering.

4 Claims, 5 Drawing Sheets

STEERING APPARATUS FOR A VEHICLE

FIELD OF THE INVENTION

The present invention relates to a steering apparatus which can steer a vehicle by either hydraulic or mechanical method.

DESCRIPTION OF THE PRIOR ART

The various prior arts are well-known which relate to a power steering mechanism which is capable of steering the vehicle not mechanically but hydraulically.

The prior art of simply constituting such hydraulic vehicle steering apparatus is well-known as disclosed in the Japanese Utility Model Laid-Open Gazette No. Sho 61-152576.

SUMMARY OF THE INVENTION

In the prior art, the vehicle is provided at part of a drag rod thereof with a steering valve, so that the steering valve is mounted to the lower portion at the running vehicle and may overlap with disposition of a steering cylinder S, thereby causing inconvenience such that a mounting space is restricted and a space for hydraulic piping is not obtainable.

Also, gears in a steering gear box is required as the same as the conventional and the drag rod is so, thereby having inconvenience that it is not simplified from a viewpoint in the number of parts. The present invention has been designed to eliminate the above defect. An object of the invention is to provide a steering apparatus for a vehicle, which eliminates the aforesaid defect.

The above and further objects and novel features of the invention will more fully appear from the following detailed description when the same is read in connection with the accompanying drawings.

DESCRIPTION OF THE PREFERRED EMBODIMENT

Figure 1:
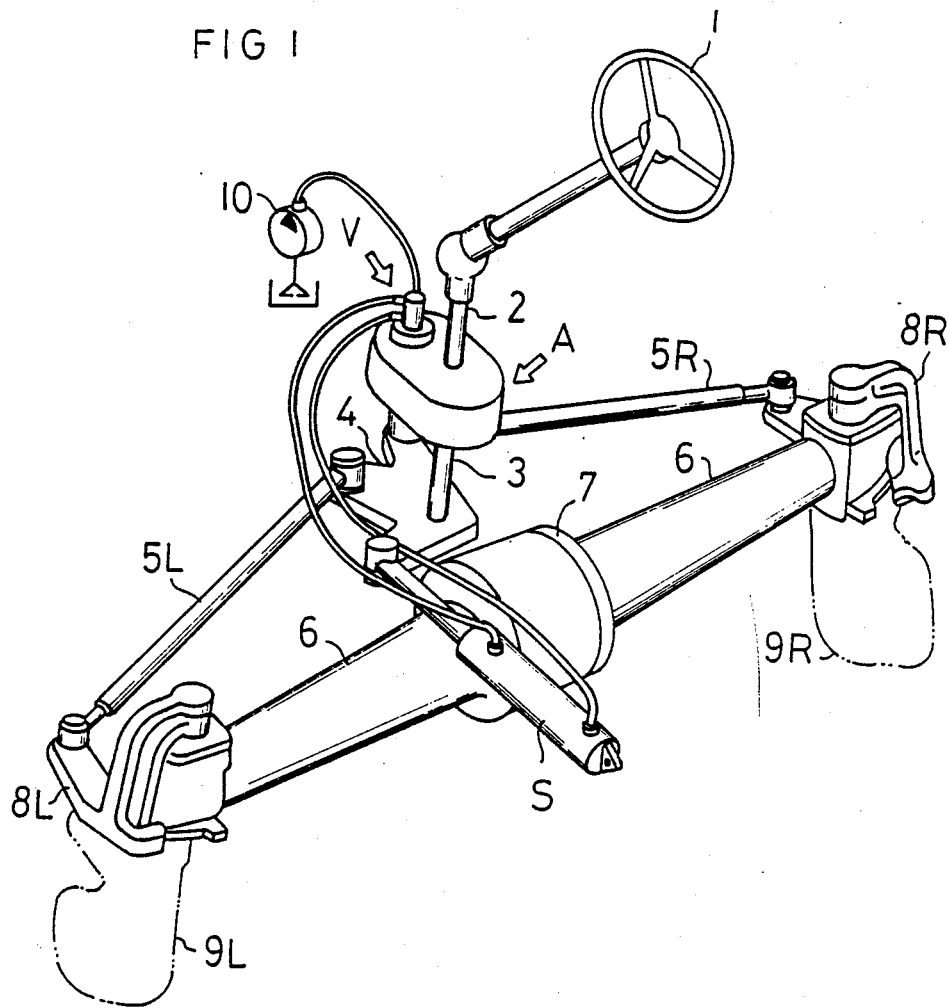
FIG. 1 is a perspective view of an embodiment of a steering apparatus for a vehicle of the invention as a whole.

Referring to FIG. 1, a steering apparatus for a vehicle will be described of its entire construction, in which front wheels as the steering wheels are shown.

Left and right front axles 6 project from a front differential case 7, and steering bevel gear boxes 9L and 9R are disposed at the outer ends of the front axles 6 respectively.

Tie rods 5L and 5R extending from knucle arms 8L and 8R for rotating the bevel gear boxes 9L and 9R to be steered are pivotally connected to a drag arm 4 at the center of the vehicle body.

At the axis of rotation of the drag arm 4 is provided a steering wheel side shaft 3. The shaft 3 is rotated by rotating a handle 1, and by expanding or contracting a steering cylinder S through switching of a steering hydraulic valve V.

A steering mechanism A of the principal portion of the invention is disposed between a handle shaft 2 at the handle 1 and the steering wheel side shaft 3 at the drag arm 4. In addition, a hydraulic pump 10 is provided.

Next, explanation will be given on construction of the steering mechanism A with reference to FIGS. 2 to 4.

A steering hydraulic valve V is fixed to the upper or lower surface of a steering case 12 so that a spool 22 is operated to axially move by rotation of a helical gear to be discussed below.

Figure 5:
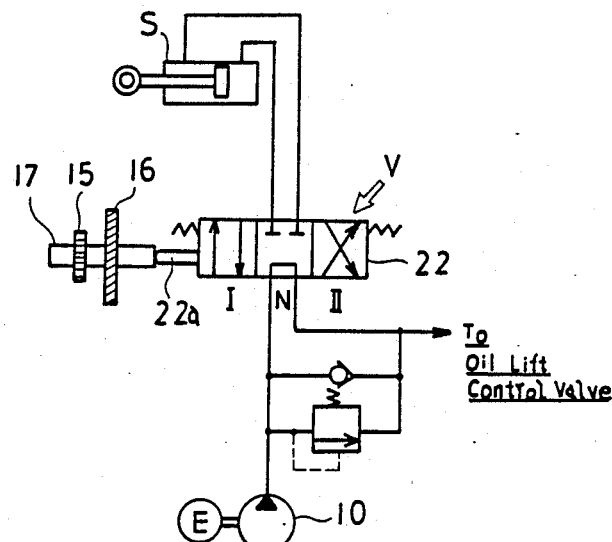
FIG. 5 is a circuit diagram of a hydraulic system.
Figure 6:
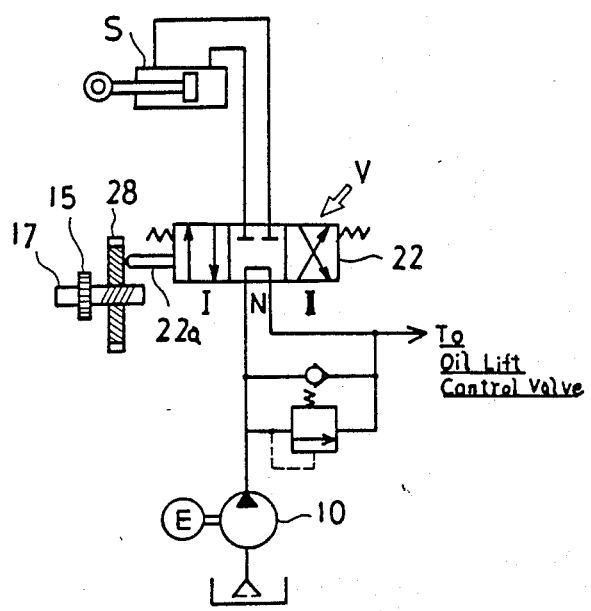
FIG. 6 is a circuit diagram, similar to FIG. 5, of an alternate embodiment of the hydraulic system of the present invention.

The steering hydraulic valve V, as shown in FIG. 5, comprises a valve case 24 and the spool 22 slidable therein.

Pressure oil directionally controlled by the steering hydraulic valve V is fed to a steering cylinder S and the drag arm 4 rotates around the steering wheel side shaft 3 following expansion and contraction of the steering cylinder S.

Next, explanation will be given on an embodiment of the invention in FIG. 2.

The steering mechanism A is provided at the lower portion with a steering casing 12 and closed at the upper surface with a lid 13, and a handle shaft 2 inserted from above and the steering wheel side shaft 3 projecting from below are disposed coaxially with each other.

A counter shaft 17 is disposed in parallel to the handle shaft 2 and steering wheel side shaft 3.

Figure 2:
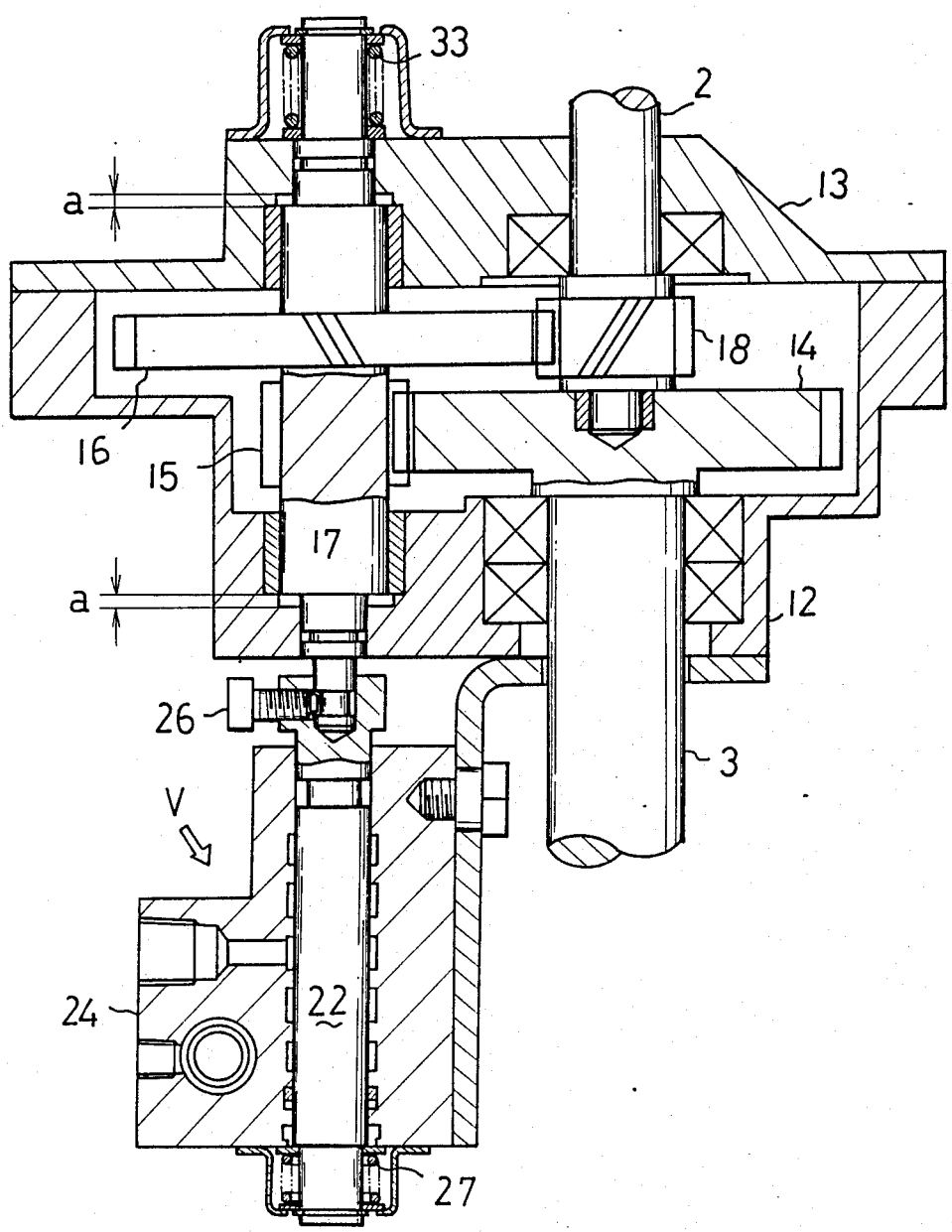
FIG. 2 is a sectional side view of a steering case at a steering mechanism in the FIG. 1 embodiment.
Figure 3:
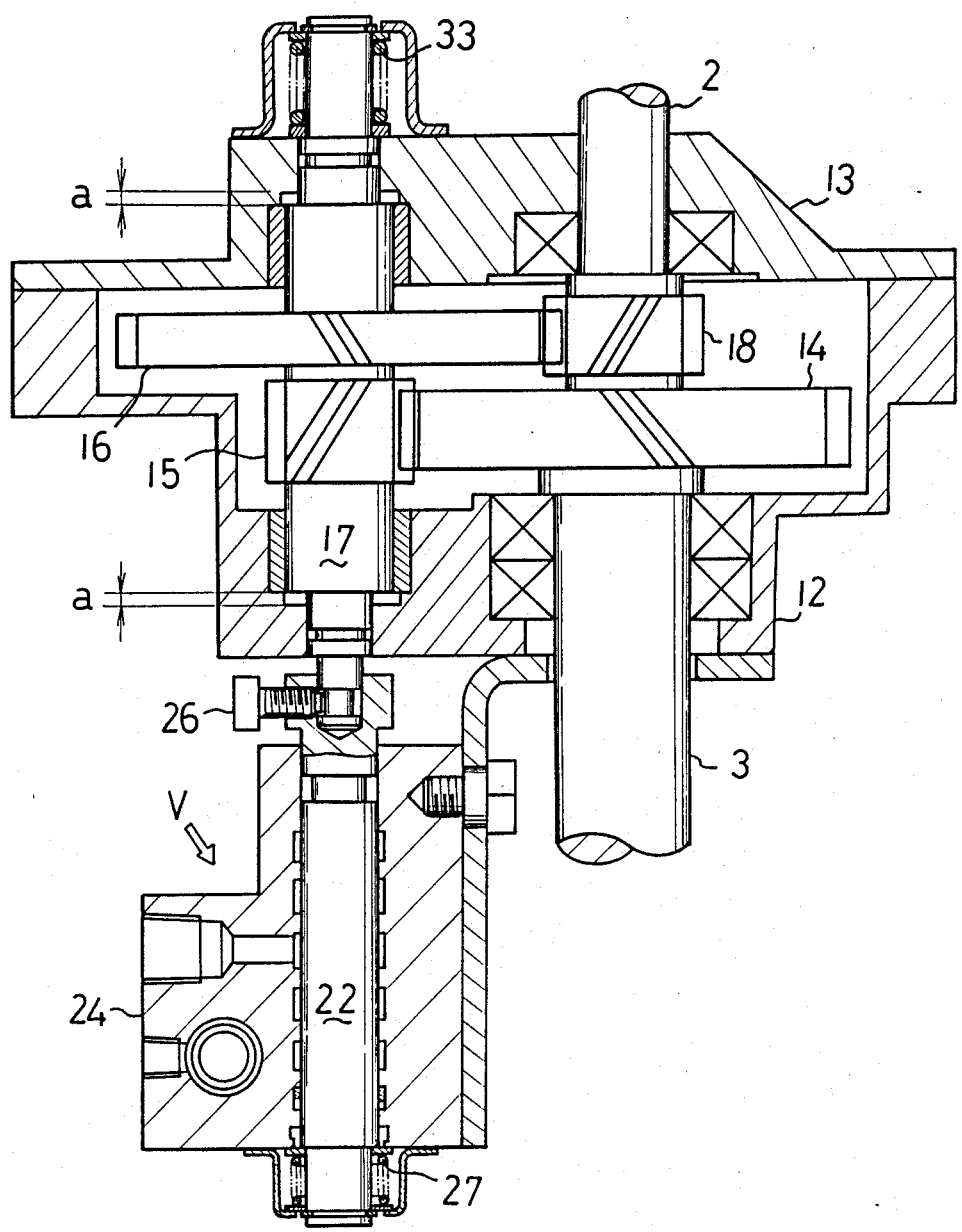
FIG. 3 is a sectional side view of a steering case at the same in a modified embodiment of the invention.
Figure 4:
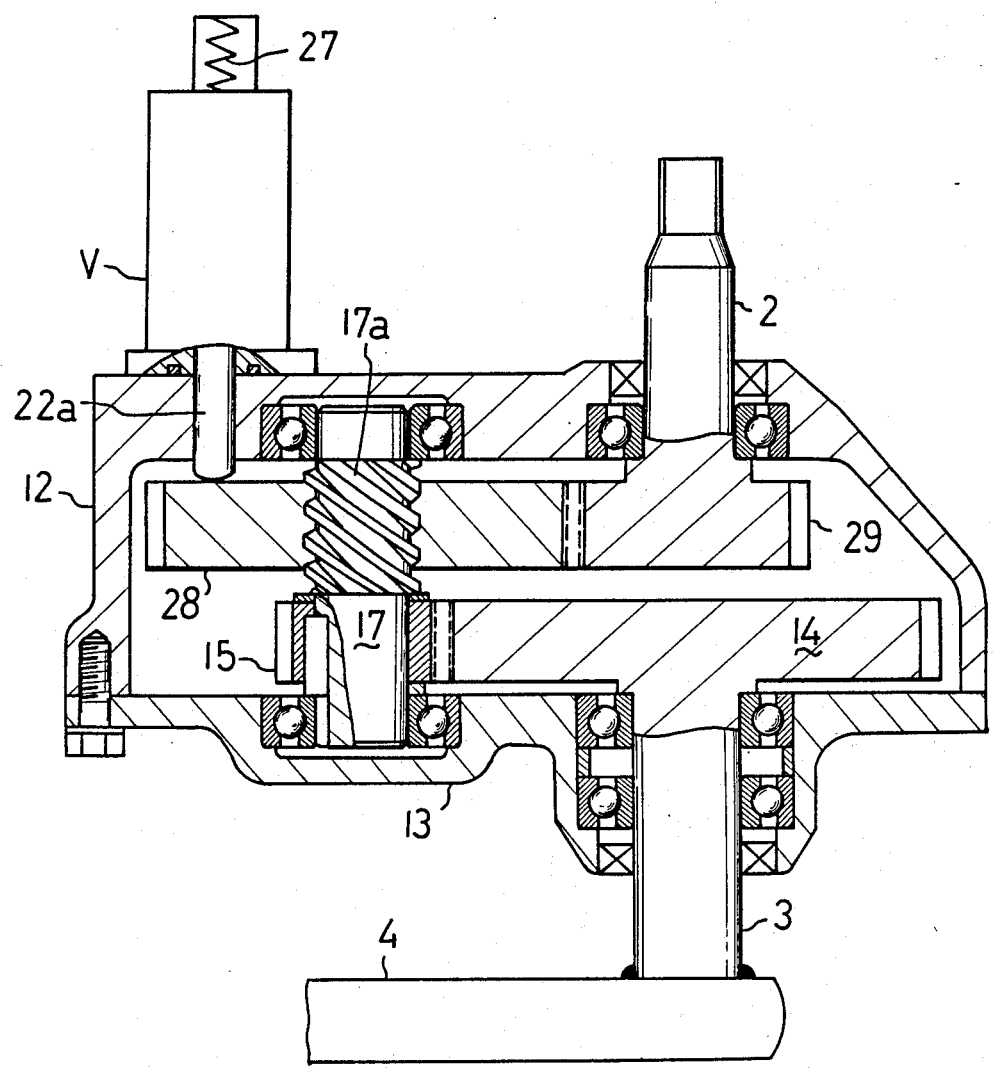
FIG. 4 is a sectional side view of another modified embodiment of the same, in which a gear axially slides.

In the embodiments of the invention shown in FIGS. 2 and 3, the counter shaft 17 is supported axially slidably in a predetermined range, and abuts at one end against the spool 22 at the steering hydraulic valve V biased by a spring 27.

At the lower end of the handle shaft 2 is fixed a helical gear 18, which engages with a helical gear 16 on the counter shaft 17 so as to constitute a first gear train.

A spur gear 15 on the counter shaft 17 engages with a spur gear 14 on the steering wheel side shaft 3 so as to constitute a second gear train.

Combination of the first and second gear trains constitutes a reduction gear mechanism to reduce the rotational speed of handle shaft 2 and transmit it to the steering wheel side shaft 3.

Between both ends of a larger diameter portion of the counter shaft 17 on which the spur gear 15 and helical gear 16 are fixed and the steering case 12 and lid 13 are provided gaps a respectively, through which gaps the counter shaft 17 is axially movable.

Such construction renders the helical gear 18 rotatable when the handle 1 is rotated. In this case, however, since the drag arm 4 is in a fixed or static condition, the spur gears 14 and 15 and counter shaft 17 do not rotate following the rotation of helical gear 18, but a torque of the helical gear 18 is applied to the helical teeth of the helical gear 16 so that the torque is converted to a force for axially sliding the helical gear 16 so as to axially move the counter shaft 17 integral therewith, thereby being converted into an operating force to switch the steering hydraulic valve V.

Therefore, the handle 1 rotates leftwardly or rightwardly to vertically move the counter shaft 17 by a gap a, so that the spool 22 is slidable to the position shown by I or II in FIG. 5, thereby switching the steering hydraulic valve V.

The steering hydraulic valve V is switched to expand or contract the steering cylinder S so that the drag arm 4 rotates around the steering wheel side shaft 3, whereby the steering wheel side shaft 3 rotates so as to rotate the counter shaft 17 through the spur gears 14 and 15.

When the drag arm 4 rotates, an operator fixes the handle 1, whereby the helical gear 18 is stationary. Now, a torque of the helical gear 16 is applied to the helical gear 18 which is not rotatable, whereby the helical gear 16 is subjected to an axially moving force to apply an operating force to the counter shaft 17 to be moved in the reverse direction to the above.

The operating force, after steering operation, returns the steering hydraulic valve V to the neutral position N shown in FIG. 5.

A reference numeral 33 designates a spring for biasing the counter shaft 17, which cooperates with the spring 27 to always bias the steering hydraulic valve V to the neutral position.

In addition, the spool 22 and counter shaft 17 are disposed coaxially with each other and connected through a connecting bolt 26.

Alternatively, reversely to the FIG. 2 embodiment, the first gear train may comprise spur gears in engagement with each other and the second gear train may comprise helical gears in engagement with each other.

Next, explanation will be given on a modified embodiment in FIG. 3.

In this case, the engagements of helical gears with each other are formed in both the first and second gear trains and the helical gears in each gear train are different in the direction of the helical teeth from each other.

Hence, it is the same as the former embodiment that the rotation of handle shaft 2 is applied from the helical gear 18 to that 16 so as to generate a sliding force which axially moves the counter shaft 17.

However, the helical gear 15 fixed onto the counter shaft 17 engages with the helical gear 14 on the steering wheel side shaft 3. Although the helical gears 15 and 16 are different in the inclining direction of teeth, they are different in the transmitting direction of the driving dorce, whereby the engaging portion is similarly subjected to a sliding force for axially sliding the counter shaft 17 to push or pull the steering hydraulic valve V, resulting in that both the helical gear trains in engagements apply the sliding force in the same directions. Hence, it is possible to increase the sliding force and reduce an operating force by the operator to control the handle 1.

Next, explanation will be given on the steering mechanism A with reference to FIG. 4.

The steering hydraulic valve V is fixed onto the upper surface of steering case 12 so that a spur gear 28 mounted on helical splines 17a is given an axially moving force by the inclined surface of the helical splines 17a and moves to operate a spool 22.

A spur gear 29 is fixed to the lower end of handle shaft 2 and engages with the spur gear 28 on the counter shaft 17 so as to constitute the first gear train.

A spur gear 15 keyed on the counter shaft 17 engages with a spur gear 14 fixed on the steering wheel side shaft 3 so as to constitute the second gear train.

The counter shaft 17 engages with the spur gear 28 through the male helical splines 17a formed at the outer periphery of the counter shaft 17 and female helical splines at the inner periphery of the spur gear 28.

An end 22a of the spool 22 at the steering hydraulic valve V abuts against the lateral side of the spur gear 28 in spline engagement with the counter shaft 17.

In the aforesaid embodiments, when a hydraulic pump is in trouble or an engine stops to feed no pressure oil, the steering hydraulic valve V and steering cylinder S are not operable, but when the handle 1 is rotated to slide the helical gear 16, counter shaft 17 and spur gear 28 in an entire moving range and then further rotated in such the state, the axially moving force of these members is converted into a torque to rotate each gear within the steering mechanism A, whereby the steering wheel side shaft 3 is rotatable at the reduced speed. Hence, the drag arm 4 can manually be rotated by a light operating force, thereby steering the vehicle.

Referring to FIG. 5, a hydraulic circuit is shown, in which the pressure oil discharged from the hydraulic pump 10 is used for the steering apparatus of the invention, and thereafter fed to another hydraulic apparatus for lifting a working machine.

The present invention constructed as abovementioned has the following effects:

Firstly, in a case where the hydraulic pump is broken down or the engine stops, after the counter shaft 17 or the helical gear 16 is moved in the entire moving range, the handle 1 is further rotated, so that the steering apparatus of the invention can be manually steered as the same as the usual mechanically steering apparatus, thereby being steerable in safety even when the hydraulic system is in failure.

Secondly, the steering hydraulic valve V is merely attached to part of the steering mechanism A and the steering cylinder S is interposed between the drag arm 4 and the body frame, thereby obtaining the hydraulic steering apparatus. Conversely, when these components are removed, the steering apparatus can be converted into the manually steering apparatus as the same as the conventional, thereby enabling the simple steering apparatus for the vehicle to be constituted.

Thirdly, the steering mechanism A constitutes the first and second gear trains between the handle shaft 2 and the counter shaft 17 disposed in parallel to the steering wheel side shaft 3, thereby enabling the steering apparatus to be extremely simple and inexpensive to produce.

Fourthly, the helical gears and helical splines incorporated in the speed reduction gear mechanism render the gears on the counter shaft and the counter shaft itself to be axially slided so that the steering hydraulic valve V can be switched by means of part itself of the speed reduction gear mechanism, thereby not requiring the member for switching the valve V.

Although several embodiments have been described, they are merely exemplary of the invention and not to be constructed as limiting, the invention being defined solely by the appended claims:

What is claimed is:

1. A steering system for a vehicle, comprising:
   (a) a handle shaft having an upper end, and a lower end;
   (b) a handle shaft gear disposed on said lower end of said handle shaft;
   (c) a counter shaft having an upper end, and a lower end;
   (d) a first counter shaft gear disposed on said counter shaft, said first counter shaft gear engaging with said handle shaft gear to form a first gear train;

(e) a second counter shaft gear disposed on said lower end of said counter shaft;

(f) a side shaft having an upper end and a lower end;

(g) a side shaft gear disposed on said upper end of said side shaft, said side shaft gear engaging with said second counter shaft gear to form a second gear train, wherein said first gear train and said second gear train constitute a speed reduction gear mechanism; and (h) a hydraulic valve, wherein said lower end of said counter shaft is in engagement with said hydraulic valve, and wherein, at least one of the first and second gear trains includes means for axially moving the counter shaft in response to torque applied to said handle shaft to activate said hydraulic valve.

2. A steering system for a vehicle as set forth in claim 1, wherein said first gear train includes said means for axially moving said counter shaft, said means comprising a helical gear which transmits torque applied to said handle shaft to said counter shaft, whereby a difference in relative rotation between said handle shaft and said counter shaft produces axial movement of said counter shaft.

3. A steering system for a vehicle as set forth in claim 1, wherein said second gear train includes said means for axially moving said counter shaft, said means comprising a helical gear which transmits torque applied to said counter shaft to said side shaft, whereby a difference in relative rotation between said counter shaft and said side shaft produces axial movement of said counter shaft.

4. A steering system for a vehicle as set forth in claim 3, wherein said first gear train and said second gear train include said means for axially moving said counter shaft, said means comprising helical gears;

said helical gear of said first gear train having gear teeth which are disposed in an opposite direction of gear teeth of said helical gear of said second gear train whereby the axial force on said counter shaft is increased as a result of the difference in relative rotation between said handle shaft and said side shaft, thereby causing axial motion which controls said hydraulic valve.

* * * * *